Patented Mar. 20, 1951

2,545,492

UNITED STATES PATENT OFFICE 2,545,492

FABRICS OF A LONG CHAIN AMINO-ETHOXY CELLULOSE AND THE METHOD OF MAKING THE SAME

John David Reid and George C. Daul, New Orleans, La., assignors to United States of America as represented by the Secretary of Agriculture No Drawing. Application January 23, 1948, Serial No. 4,058

11 Claims. (Cl. 8—129)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to the preparation of water-repellent cellulosic materials. It particularly relates to the conferring of hydrophobic properties upon cellulose or cellulosic materials by etherifying at least some of the hydroxy groups with long-chain alkyl-amino-alkyl groups.

The principal cause of water-absorbency in cellulose is the presence of free hydroxyl groups in the glucose residues. To satisfactorily modify this property of cellulosic fabrics, to change the surface characteristics of the fiber to obtain useful water-repellent products, it is only necessary in our process to block off a small percentage of the hydroxyl groups on the fiber surface. Cellulose containing as little as 0.35–0.50% nitrogen has been satisfactorily treated with long-chain alkyl halides to produce water repellency.

An object of this invention is to prepare water-repellent cellulosic woven fabrics.

Another object of this invention is to prepare water-repellent cotton linters and yarn.

Among the materials to which our invention is applied are fabrics, linters, or yarn, of cellulose or cellulose derivatives initially containing some free hydroxyl groups, such as linen, cotton, wood pulp, and artificial silks such as viscose rayon, cuprammonium, and acetate.

The process comprises, in specific aspect, alkylating amino-ethoxy cellulosic materials with long-chain, high molecular weight alkyl halides. The primary amino-ethoxy derivatives, containing the ether linkage $NH_2-C_2H_4-O-$, are prepared by known processes. They may be made by reacting alkali cellulose with chloroethylamine, or employing ethylene imine, or by using $\beta$-aminoethyl sulfuric acid in the presence of sodium hydroxide to introduce such groups on cloth.

In our process the primary amino group is alkylated to yield secondary and tertiary amines.

An excess of the alkylating agent, or further reaction with other alkylating agents, may be employed to produce quaternary ammonium compounds, if desired for special purposes, such as modification of the dyeing properties.

In the following examples the conditions may be varied considerably. The alkyl halide, if a liquid, may be used without solvent, that is, in 100% concentration. Saturated solutions of alkyl halides in organic solvents may be employed. The proportions of alkyl halide and cellulosic derivative may be varied in a wide range, only a slight excess over the theoretical amount insuring a satisfactory product. The time required for the reaction is readily determined by simple trial. It varies from a few minutes to several hours, depending upon the temperature and other factors. The preferred temperature range is from 75° C. to 150° C. Higher temperatures may be used, where speed of, or completeness of, reaction is desired, and the degree of fiber degradation caused by heat is not too detrimental for the purpose intended.

Whereas our process is particularly directed to high molecular weight alkyl halides generally and to hexadecyl and octadecyl chlorides, bromides, and iodides, specifically other halides may be employed having an open chain of carbon atoms, preferably between 10 and 32 carbon atoms. The carbon chain may be interrupted by sulfur, oxygen, amino and unsaturated carbon linkages, and other bridges. Instead of alkyl mono halides, higher alkyl dihalides may be employed. Higher alkyl halides having substituents which do not too materially modify the hydrophobic character of the alkyl chain, may also be employed.

In the following examples 1 to 5 the amino-ethoxy cellulose cloth was prepared from cotton.

*Example 1*

Amino-ethoxy cellulose cloth containing approximately 0.75% nitrogen was soaked and padded with a 50% solution of hexadecyl bromide in benzene. The benzene was allowed to evaporate and the cloth was put into a blower oven at 130° C. for two hours. On removal from the oven the cloth was extracted with benzene three times and once with ethyl alcohol to remove excess alkyl halide. The halide may then be recovered for further use. 77.6% substitution by hexadecyl groups resulted. This was determined by titration for hydrobromic acid with standard sodium hydroxide. The product exhibited good water repellency properties after repeated soap washings and dry cleanings.

Example 2

Amino-ethoxy cellulose cloth containing approximately 0.75% nitrogen was soaked and padded with a 50% benzene solution of octadecyl iodide. The benzene was allowed to evaporate and the cloth put into a blower oven at 135° C. for one hour. On removal from the oven the cloth was soaked in hot potassium carbonate solution (2% in water) to remove hydriodic acid formed by the reaction, then dried. The cloth was then re-soaked with octadecyl iodide and the curing process repeated. The purpose of this re-treatment was to form the tertiary substituted amine, thereby approximately doubling the number of octadecyl groups. After several washings with soap solution followed by extraction with dry-cleaning solvents, good water-repellency was exhibited, and this did not decrease appreciably with subsequent washings.

Example 3

Amino-ethoxy cellulose cloth containing approximately 0.50% nitrogen was soaked and padded with a 50% benzene solution of octadecyl iodide then placed in an oven at 105–110° C. for 24 hours. On removal from the oven the cloth was extracted with hot benzene to remove excess alkyl halide, soaked in hot potassium carbonate solution (2% aqueous) to remove hydriodic acid (recoverable as potassium iodide), then washed with hot water and dried. The product exhibited good water repellency which did not diminish appreciably after repeated washing with soap solution followed by extraction with dry-cleaning solvents.

Example 4

Amino-ethoxy cellulose cloth containing approximately 0.50% nitrogen was soaked and padded with 50% benzene solution of octadecyl iodide, then clamped between two stainless steel plates to assure good heat transfer and heated at 105–110° C. for 65 hours. After removal from the plates, the sample was washed with soap and water to remove acid formed in the reaction, extracted with benzene several times and dried, after which it exhibited good water repellency. This water repellency did not diminish with subsequent extractions and washings.

Example 5

A 2"x 6" strip of amino-ethoxy cellulose cloth containing approximately 0.75% nitrogen was placed in a flask containing 10 g. of octadecyl chloride plus 0.5 g. of sodium iodide (as a catalyst) in dioxan and refluxed for 24 hours. After removal from the flask the sample was extracted with benzene and washed with soap and water. The sample showed good water repellency after repeated washings and extractions.

Example 6

Amino-ethoxy cellulose in the form of cotton linters, containing approximately 1.00% nitrogen was soaked with a 50% benzene solution of octadecyl iodide, excess squeezed out, and linters spread on a watch glass and heated in an oven at 105–110° C. for 24 hours. The linters were extracted with benzene, washed with soap solution, then with hot water, and dried. After several washings and extractions the linters were very hydrophobic as exhibited by their ability to float on water for long periods of time without becoming wet.

Example 7

Amino-ethoxy cellulose in the form of cotton linters, containing approximately 1.00% nitrogen was placed in a flask containing a dioxan solution of hexadecyl bromide and refluxed for 24 hours. The linters were extracted with benzene, washed with soap solution, then with hot water, and dried. After several washings and extractions the linters were very water repellent as shown by their ability to float on water for long periods of time without becoming wet.

Example 8

Amino-ethoxy cellulose in the form of cotton yarn containing approximately 0.50% nitrogen was soaked with a 50% benzene solution of hexadecyl bromide, the excess squeezed out and the benzene allowed to evaporate. The yarn was then suspended in a blower oven at 140° C. for one hour after which it was extracted with benzene to remove unreacted hexadecyl bromide (for recovery) and dried.

To obtain the tertiary amine, the yarn was soaked in a benzene solution of octadecyl iodide, the excess squeezed out for recovery, and the yarn suspended in a blower oven at 140° C. for one hour. After benzene extraction to remove unreacted octadecyl iodide, it was dried.

This process can obviously be repeated to produce a quaternary salt, if desired, by using an excess of an alkylating agent such as octadecyl iodide or dimethyl sulfate.

Water repellency was exhibited by the sample in its ability to float on water for a long period of time without becoming wet. This water repellency did not diminish appreciably after several soap water washings and organic solvent extractions.

As may be seen in the above examples, the reactions between alkyl halides, for example, octadecyl bromide, octadecyl iodide, octadecyl chloride, hexadecyl bromide, decyl bromide and others, and amino-ethoxy cellulose may be effected by several different methods, in different media, with or without catalysts, and at various temperatures. The first reaction produces a secondary amine and a hydrogen halide. The latter may be easily removed with dilute alkali, for example, with potassium or sodium carbonate, potassium or sodium hydroxide, or even alkali soap solutions. The secondary amine may then be re-treated either with the same or a different alkyl halide, by the same or a different process to produce the tertiary amine, thereby increasing the efficiency of the water-repelling action of the long carbon chains.

Having thus described our invention, we claim:

1. A process of making water-repellent textile fiber comprising heating together primary amino-ethoxy cellulosic fiber material, having from about 0.35 to 1.00% nitrogen, with an alkyl halide having no less than 10 carbon atoms, and an organic solvent for the halide, at about 75° C. to 150° C., and removing the formed hydrogen halide from the fiber; the primary amino-ethoxy cellulosic fiber material having substantially no other substituents on the cellulosic—OH groups.

2. A process of making water-repellent fiber comprising padding a primary amino-ethoxy cellulosic fiber with an alkyl halide, having no less than 10 carbon atoms, dissolved in a volatile organic solvent, evaporating the solvent, heat curing the impregnated fiber to react the alkyl halide and form N-alkyl amino-ethoxy cellulose, removing the formed hydrogen halide by treating the fiber with an alkaline agent, again impregnating with an alkyl halide, and heat curing the primary amino-ethoxy cellulosic fiber having substantially no other substituents on the cellulosic—OH groups, and the nitrogen content of which is no higher than about 1%.

3. A process of making water-repellent textile material comprising heating together primary amino-ethoxy cellulosic fiber material, in which the cellulose—OH groups are otherwise unsubstituted, the material having from about 0.35 to about 1% nitrogen, with an alkyl halide having 10 to 18 carbon atoms, and an organic solvent for the halide, at about 75° C. to 150° C., and removing the formed hydrogen halide by treating the fiber with an alkaline agent.

4. A process of making a water-repellent material the water-repellency of which is resistant to repeated soap washing and repeated dry-cleaning solvent action, comprising impregnating a primary amino-ethoxy cellulose woven fabric having from 0.35 to 1% nitrogen with a solution of a halide having a chain of at least 10 carbon atoms in a volatile organic solvent, heating to react the halide, and removing the formed hydrogen halide from the fabric with an alkaline agent.

5. A process of making water-repellent cellulose cloth, the water-repellency of which is resistant to repeated laundering and dry-cleaning, comprising reacting an amino-ethoxy cellulose cloth having from about 0.35 to 1% nitrogen, and which has substantially no other substituents on the cellulosic—OH groups, with an alkyl halide having a chain of 10 to 18 carbon atoms, at about 75° C. to 150° C., and removing the formed hydrogen halide from the cloth with an alkaline agent.

6. A process of making water-repellent cellulosic material, the water-repellency of which is resistant to repeated laundering and dry-cleaning, comprising: reacting an alkyl halide, having a chain of at least 10 carbon atoms, with a primary amino-ethoxy cellulosic material having from about 0.35 to 1% nitrogen, by impregnating the latter with a volatile organic solvent solution of the said alkyl halide and heating at about 75° C. to 150° C.; and removing the formed hydrogen halide, held by the cellulosic material, with an alkaline agent.

7. The process of claim 1 in which the solvent is dioxane and the reaction is under reflux.

8. The process of claim 1 in which the solvent is dioxane, and the reaction is under reflux and in the presence of alkali halide as catalyst.

9. A water-repellent cotton cellulose material, the water-repellency of which is resistant to repeated soap laundering and dry-cleaning solvent action, being cotton cellulose having from 0.35 to 1 percent nitrogen in the form of amino-ethoxy groups, the amino nitrogen being substituted by a radical having a chain of 10 to 18 carbon atoms, the cellulose material being otherwise substantially unsubstituted.

10. The process of claim 3 in which the halide is taken from the group consisting of hexadecyl and octadecyl bromide, iodide, and chloride.

11. The product defined in claim 9 in which the said radical is taken from the group consisting of hexadecyl and octadecyl.

JOHN DAVID REID.
GEORGE C. DAUL.

REFERENCES CITED

The following references are of record in the file of this patent:

UNITED STATES PATENTS

| Number | Name | Date |
| --- | --- | --- |
| 1,777,970 | Hartmann | Oct. 7, 1930 |
| 1,800,944 | Lilienfeld | Apr. 14, 1931 |
| 2,015,104 | Dreyfus | Sept. 24, 1935 |
| 2,101,262 | Maxwell | Dec. 7, 1937 |
| 2,136,296 | Hardy | Nov. 8, 1938 |
| 2,233,475 | Dreyfus | Mar. 4, 1941 |
| 2,261,294 | Schlack | Nov. 4, 1941 |

FOREIGN PATENTS

| Number | Country | Date |
| --- | --- | --- |
| 489,668 | Great Britain | Aug. 2, 1938 |